United States Patent
Chan et al.

(10) Patent No.: US 11,937,041 B2
(45) Date of Patent: Mar. 19, 2024

(54) AUDIO DEVICES AND METHODS OF OPERATING AN AUDIO DEVICE

(71) Applicant: RAZER (ASIA-PACIFIC) PTE. LTD., Singapore (SG)

(72) Inventors: Chee Oei Chan, Singapore (SG); Kah Yong Lee, Singapore (SG); Gui Mei Dai, Singapore (SG); Chung-Ling Lee, Singapore (SG); Shyh Lai Long, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 17/762,891

(22) PCT Filed: Oct. 6, 2020

(86) PCT No.: PCT/SG2020/050564
§ 371 (c)(1),
(2) Date: Mar. 23, 2022

(87) PCT Pub. No.: WO2021/076048
PCT Pub. Date: Apr. 22, 2021

(65) Prior Publication Data
US 2022/0360882 A1  Nov. 10, 2022

Related U.S. Application Data
(60) Provisional application No. 62/916,143, filed on Oct. 16, 2019.

(51) Int. Cl.
*H04R 1/10* (2006.01)
*H04B 17/318* (2015.01)
(Continued)

(52) U.S. Cl.
CPC ......... *H04R 1/1041* (2013.01); *H04B 17/318* (2015.01); *H04R 1/1016* (2013.01);
(Continued)

(58) Field of Classification Search
CPC ............. H04R 2420/07; H04R 1/1041; H04R 1/1033; H04R 2430/01; H04R 3/12;
(Continued)

(56) References Cited

U.S. PATENT DOCUMENTS 3,582,964 A * 6/1971 Torick ...................... H03G 9/14
381/103
10,631,363 B1 * 4/2020 Xian ..................... H04R 1/1041
(Continued)

FOREIGN PATENT DOCUMENTS

EP  2043388 A2  4/2009
EP  2590436 A1  5/2013
(Continued)

OTHER PUBLICATIONS

European Search Report for corresponding EP Application No. 20876413.4 dated Feb. 13, 2023 (11 pages).
(Continued)

*Primary Examiner* — Lun-See Lao
(74) *Attorney, Agent, or Firm* — Polsinelli PC

(57) ABSTRACT

An audio device includes a first earbud and a second earbud, each of which is configured to establish respective first and second wireless links with an audio source, and receive, from the audio source, audio information over the respective first and second wireless links. The first earbud and the second earbud are further configured to communicate with one another over a third wireless link. At least one of the first earbud and the second earbud includes a measurement circuit configured to measure respective signal strengths of the first, second and third wireless links, a computation
(Continued)

circuit configured to compute a difference in signal strengths of the first and second wireless links, and a determination circuit configured to determine an operating environment of the audio device based on the computed difference and further based on the signal strength of the third wireless link.

16 Claims, 10 Drawing Sheets

(51) Int. Cl.
  *H04R 29/00* (2006.01)
  *H04W 76/15* (2018.01)
(52) U.S. Cl.
  CPC ............ *H04R 29/00* (2013.01); *H04W 76/15* (2018.02); *H04R 2420/07* (2013.01)
(58) Field of Classification Search
  CPC ........ H04R 5/033; H04R 5/04; H04R 1/1016; H04R 1/1091; H04R 25/552; H04R 29/00; H04W 4/80; H04W 52/0209; H04W 52/0245; H04W 76/15; H04W 88/02; H04B 17/318; G06F 1/3206; G06F 1/3215; G06F 1/3278
  USPC .......................................... 381/56–58; 700/94
  See application file for complete search history.

(56) References Cited

U.S. PATENT DOCUMENTS

| | | | |
|---|---|---|---|
| 10,674,290 B2* | 6/2020 | Ungstrup ........... | H04M 1/72475 |
| 2012/0082461 A1* | 4/2012 | Meyer .............. | H04N 21/42206 |
| | | | 398/106 |
| 2013/0316642 A1* | 11/2013 | Newham ........... | H04W 52/0206 |
| | | | 455/67.11 |
| 2015/0097759 A1* | 4/2015 | Evans ................. | G02B 27/017 |
| | | | 345/8 |
| 2016/0142821 A1* | 5/2016 | Lin ......................... | H04W 4/80 |
| | | | 381/80 |
| 2016/0219358 A1* | 7/2016 | Shaffer ................ | H04R 1/1016 |
| 2017/0111834 A1 | 4/2017 | Belverato | |
| 2017/0155992 A1* | 6/2017 | Perianu ................ | H04R 1/1016 |

FOREIGN PATENT DOCUMENTS

| EP | 2871857 A1 | 5/2015 |
|---|---|---|
| KR | 10-2017-0105795 A1 | 9/2017 |

OTHER PUBLICATIONS

International Search Report, PCT/SG2020/050564, dated Jan. 15, 2021.

\* cited by examiner

AUDIO DEVICES AND METHODS OF OPERATING AN AUDIO DEVICE

CROSS-REFERENCE TO RELATED APPLICATIONS

This application claims the benefit of U.S. Patent Application No. 62/916,143 filed 16 Oct. 2019, the entire contents of which are incorporated herein by reference for all purposes.

TECHNICAL FIELD

Various embodiments relate to an audio device and methods of operating an audio device, in particular, an audio device that includes wireless earbuds.

BACKGROUND

True wireless earbuds are gaining popularity among users of mobile devices, as they are small and lightweight, which makes them comfortable to wear for extended durations. Their lack of wires or dongles also make them convenient to use, especially while the user is on the go. However, there are many challenges in designing a well-performing pair of true wireless earbuds. These earbuds can only accommodate miniature antennae, which are generally limited in transmission and reception strength. Moreover, the human body absorbs much of the radiofrequency energy of the earbuds' communication links, thereby weakening the signal strength of communication links of the earbuds. Audio data from a mobile device is packetized and sent to receivers in the earbuds. The audio data typically needs to reach the receivers within a given time period, before the data packets are dropped. If the signal strength of the communication link is weak, audio data packets may be dropped, causing gaps in the audio stream played by the earbuds. As a result, the user may hear a popping or cracking noise due to the gaps in the audio stream, which detrimentally affects user experience.

SUMMARY

According to various embodiments, there may be provided an audio device including a first earbud and a second earbud. The first earbud may be configured to establish a first wireless link with an audio source; and receive, from the audio source, audio information over the first wireless link. The second earbud may be configured to establish a second wireless link with the audio source; and receive, from the audio source, audio information over the second wireless link. The first earbud and the second earbud may be further configured to communicate with one another over a third wireless link. At least one of the first earbud and the second earbud may include a measurement circuit, a computation circuit and a determination circuit. The measurement circuit may be configured to measure respective signal strengths of the first, second and third wireless links. The computation circuit may be configured to compute a difference in signal strengths of the first and second wireless links. The determination circuit may be configured to determine an operating environment of the audio device based on the computed difference and further based on the signal strength of the third wireless link.

According to various embodiments, there may be provided a method of operating an audio device that includes a first earbud and a second earbud. The method may include establishing first and second wireless links with an audio source, by the first and second earbuds, respectively; receiving in each of the first and second earbuds, audio information from the audio source, over the first and second wireless links, respectively; the first earbud and the second earbud communicating with one another over a third wireless link; measuring respective signal strengths of the first, second and third wireless links, using a measurement circuit; computing a difference in signal strengths of the first and second wireless links, using a computation circuit; and determining an operating environment of the audio device based on the computed difference and further based on the signal strength of the third wireless link, using a determination circuit.

According to various embodiments, there may be provided an audio device including a first earbud and a second earbud. The first earbud may be configured to establish a first wireless link with an audio source; and receive, from the audio source, audio information over the first wireless link. The second earbud may be configured to establish a second wireless link with the audio source; and receive, from the audio source, audio information over the second wireless link. The first earbud and the second earbud may be further configured to communicate with one another over a third wireless link. At least one of the first earbud and the second earbud may include a measurement circuit, a comparison circuit, and an operation mode controller. The measurement circuit may be configured to measure signal strength of the third wireless link. The comparison circuit may be configured to compare the measured signal strength of the third wireless link against a predefined threshold during a predefined duration. The operation mode controller may be configured to switch the audio device to operate in a sleep mode, based on the comparison indicating that the measured signal strength of the third wireless link is larger than the predefined threshold continuously during the predefined duration. In the sleep mode, the first and second wireless links may be disconnected.

According to various embodiments, there may be provided a method of operating an audio device that includes a first earbud and a second earbud. The method may include establishing first and second wireless links with an audio source, by the first and second earbuds, respectively; receiving in each of the first and second earbuds, audio information from the audio source, over the first and second wireless links, respectively; the first earbud and the second earbud communicating with one another over a third wireless link; measuring respective signal strengths of the first, second and third wireless links, using a measurement circuit; comparing the measured signal strength of the third wireless link against a predefined threshold during a predefined duration, using a comparison circuit; and switching the audio device to operate in a sleep mode, based on the comparison indicating that the measured signal strength of the third wireless link is larger than the predefined threshold continuously during the predefined duration, using an operation mode controller. wherein in the sleep mode, the first and second wireless links are disconnected.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In this context, the device as described in this description may include a memory which is for example used in the processing carried out in the device. A memory used in the embodiments may be a volatile memory, for example a DRAM (Dynamic Random-Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In order that the invention may be readily understood and put into practical effect, various embodiments will now be described by way of examples and not limitations, and with reference to the figures.

Figure 1A:
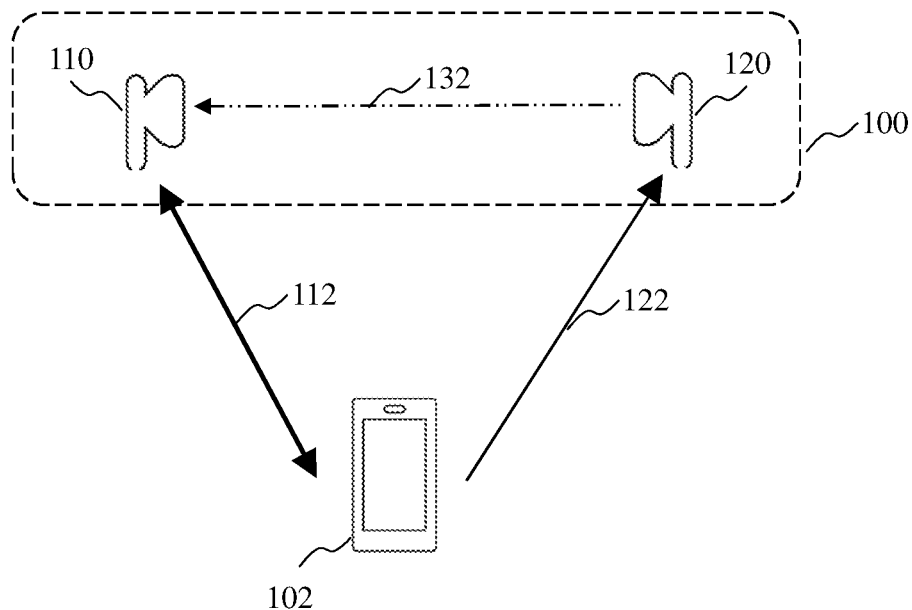
FIGS. 1A and 1B show schematic diagrams of an audio device in different modes of operation, according to various embodiments.
Figure 1B:
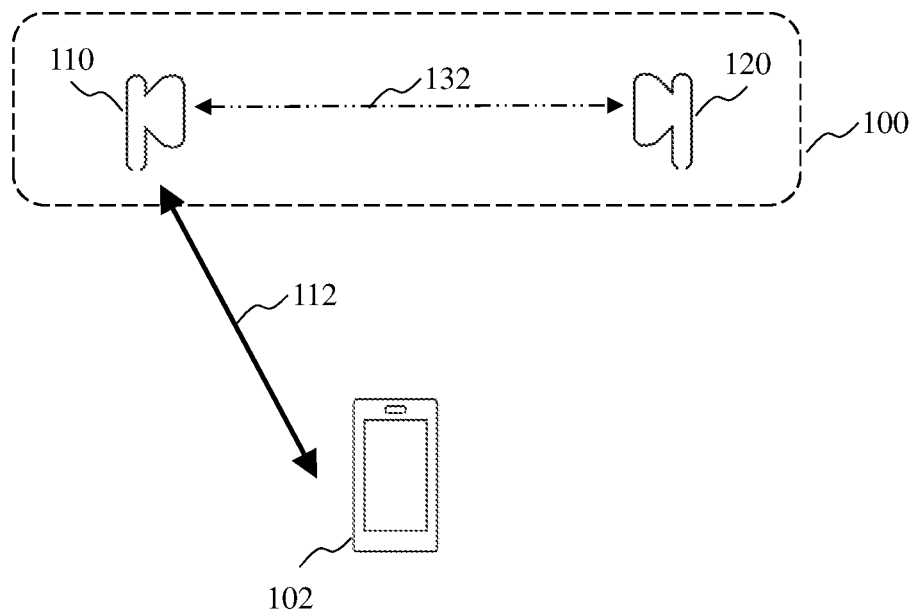

FIGS. 1A and 1B show schematic diagrams of an audio device 100 in different modes of operation, according to various embodiments. The audio device 100 may include a first earbud 110 and a second earbud 120, each of which may be true wireless earbuds. The audio device 100 may form a wireless audio system together with an audio source 102. The audio source 102 may be any one of a mobile phone (for example, a Blackberry, an iPhone, etc.), a portable game player, a portable media player (for example, a MP3 player, an iPod, etc.), a computer (for example, a personal computer, an Apple computer, etc.), and an audio/video (A/V) receiver that is part of a home entertainment or home theater system. Each of the first earbud 110, the second earbud 120 and the audio source 102 may include a wireless transceiver configured to transmit and receive Radio Frequency (RF) signals. The first and second earbuds 110, 120 may be similar in their functionality, but may have different external housings, for fitting into left and right ears of a user, respectively. Each of the first and second earbuds 110, 120 may include an electro-acoustic transducer (not shown in the figures) that is configured to convert digital audio information into sound waves. While the first and second earbuds 110, 120 are referred to as "earbuds", they may also be implemented as earphones, headphones or earpieces.

Referring to FIG. 1A, the audio device 100 may operate in a snooping mode, where each of the first and second earbuds 110, 120 directly receives audio information from the audio source 102. The audio information may include one or more data packets containing stereo audio information. The first earbud 110 may communicate with the audio source 102 via a first wireless link 112, while the second earbud 120 may communicate with the audio source 102 via a second wireless link 122. The first and second earbuds 110, 120 may communicate with one another via a third wireless link 132. The first and second earbuds 110, 120 may mutually exclusively function in master and slave modes.

As an example, FIG. 1A shows the first earbud 110 operating in the master mode (in other words: functioning as a master earbud) and the second earbud 120 operating in the slave mode (in other words: functioning as a slave earbud). As the master earbud, the first earbud 110 may establish the third wireless link 132 with the second earbud 120. The first earbud 110 may establish the first wireless link 112 with the audio source 102 and may receive audio information from the audio source 102 through the first wireless link 112. Similarly, the second earbud may establish the second wireless link 122 with the audio source 102 and may receive audio information from the audio source 102 through the second wireless link 122. The second earbud 120, operating as a slave earbud, may generate and transmit link information about the second wireless link 122, to the first earbud 110, through the third wireless link 132. The link information about the second wireless link 122 may include an acknowledgement data packet generated by the second earbud 120 upon receipt of audio information from the audio source 102. The first earbud 110 may also generate link information about the first wireless link 112. The link information about the first wireless link 112 may also include an acknowledgement data packet generated by the first earbud 110 upon receipt of the audio information from the audio source 102. The first earbud 110 may transmit status information to the audio source 102 through the first wireless link 112. The status information may include both the link information about the second wireless link 122 received from the second earbud 120, and the link information about the first wireless link 112. As the first earbud 110 needs to transmit the status information to the audio source 102, the first wireless link 112 may be a bidirectional communication link, as compared to the second wireless link 122 which may be a unidirectional communication link.

Referring to FIG. 1B, the audio device 100 may operate in a relay mode, where only the master earbud may communicate with the audio source 102. The master earbud may receive the audio information from the audio source 102, and then relay the audio information to the slave earbud. The slave earbud may communicate only with the master earbud and may not communicate with the audio source 102.

As an example, FIG. 1B shows the first earbud 110 operating in the master mode (in other words: functioning as a master earbud) and the second earbud 120 operating in the slave mode (in other words: functioning as a slave earbud). The first earbud 110 may receive the audio information from the audio source 102 through the first wireless link 112, and then transmit, i.e. relay, the audio information to the second earbud 120 through the third wireless link 132. The second wireless link 122 may be disconnected. Like in the snooping mode, the first earbud 110 may also receive link information from the second earbud 120 via the third wireless link 132 in the relay mode. However, in the relay mode, the link information received from the second earbud 120 may include information about the third wireless link 132. The link information received from the second earbud 120 may include an acknowledgement data packet generated by the second earbud 120 upon receipt of the audio information from the first earbud 110. The first earbud 110 may transmit status information to the audio source 102 through the first wireless link 112. The status information may include the link information received from the second earbud 120, as well as link information about the first wireless link 112. The link information about the first wireless link 112 may include an acknowledgement data packet generated by the first earbud 110 upon receipt of the audio information from the audio source 102. The first and second earbuds 110, 120 may synchronize their playback of the audio information, by communicating timing information to one another through the third wireless link 132.

It should be understood that the roles of the first and second earbuds 110, 120 may be interchangeable, in other words, the second earbud 120 may operate as a master earbud while the first earbud 110 functions as a slave earbud.

Figure 2A:
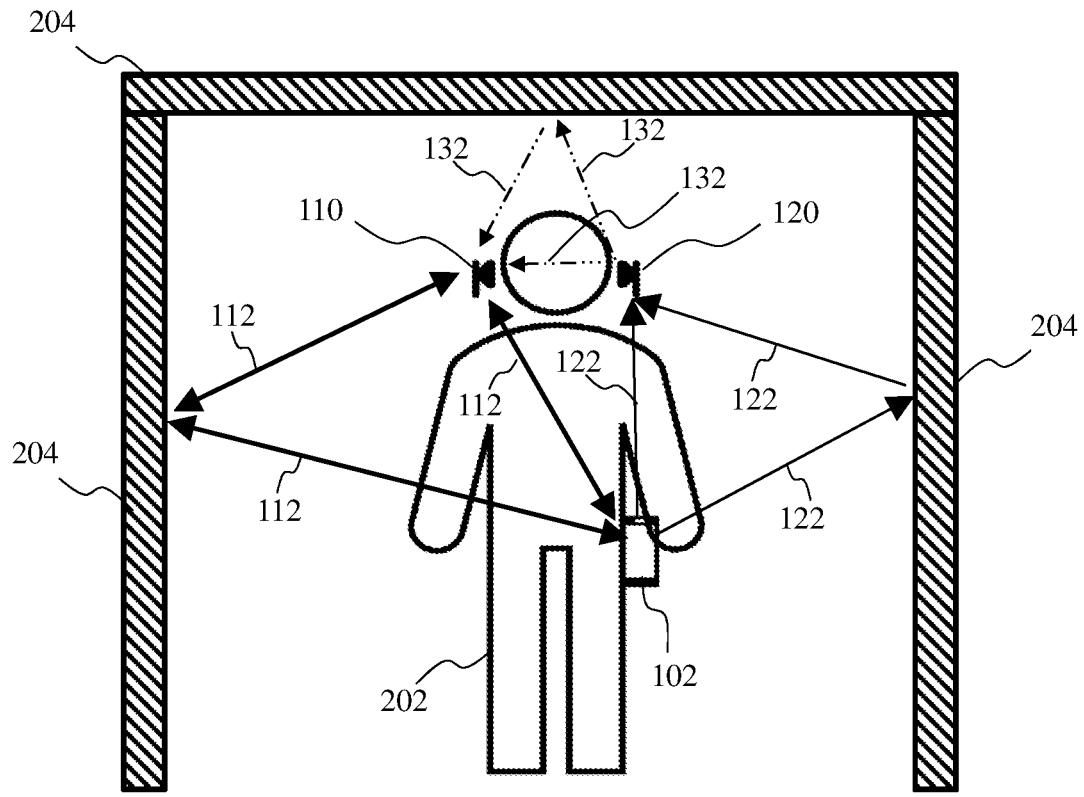
FIGS. 2A and 2B illustrate the difference in wireless communication paths, when the audio device operates in an indoor environment as compared to in an open field environment.
Figure 2B:
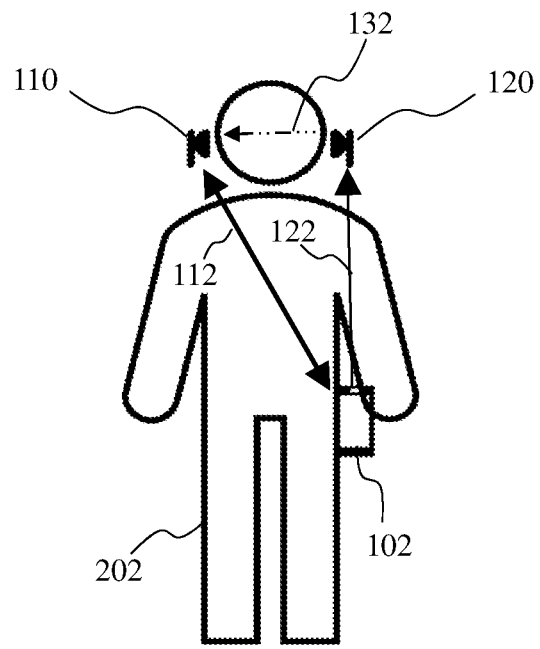

In a typical scenario, a user may wear one earbud in each ear, while carrying the audio source 102 on his body, for example, placed in a pocket of his shirt or pants. The human body may partially absorb the RF energy from the wireless communications of the earbuds and the audio source 102, thereby attenuating the signal strength of the wireless communications. The signal strengths of the wireless communications may differ, depending on an environment where the audio device 100 operates in. FIGS. 2A and 2B illustrate the difference in wireless communication paths, when the audio device 100 operates in an indoor environment as compared to in an open field environment. These figures show the audio device 100 operating in the snooping mode as described with reference to FIG. 1A, and as an example, the first earbud 110 is the master earbud while the second earbud 120 is the slave earbud.

Referring to FIG. 2A, an indoor environment typically includes multiple hard surfaces that may serve as reflectors 204 for RF signals. These reflectors 204 may be walls, ceiling, furniture or other interior fixtures. In the indoor environment, the RF signals in each of the first wireless link 112, the second wireless link 122 and the third wireless link 132 may travel directly between transmitters and receivers, as well as bounce off the reflectors 204 to reach their receivers. The presence of these multiple communication paths may enhance the stability and strength of the wireless links.

Referring to FIG. 2B, an open field environment such as a large unsheltered space, may be void of any reflectors 204. In the open field environment, the RF signals in each of the first wireless link 112, the second wireless link 122 and the third wireless link 132 may travel between transmitters and receivers only by direct paths. In the example shown, the first earbud 110 is worn on the user's right ear and the second earbud 120 is worn on the user's left ear, while the audio source 102 is placed on a left-hand side of the user's body. As a result, the first earbud 110 receives audio information from the audio source 102 via the first wireless link 112, in a direct path diagonally across the user's body. In comparison, the second earbud 120 receives audio information from the audio source 102 via the second wireless link 122, in a shorter direct path, owing to the proximity between the second earbud 120 and the audio source 102. The third wireless link 132 travels directly between the first and second earbuds 110, 120, across the user's head. The signal strength of the first wireless link 112 may be substantially attenuated, due to interference and blockage by the user's body along the direct diagonal path. Consequently, the first wireless link 112 may suffer from data packet losses. If the first earbud 110 is operating as the master earbud, the audio device 100 may not be able to function normally to playback audio to the user, as the audio device 100 would be relying on the first wireless link 112 to transmit status information to the audio source 102.

According to various embodiments, the audio device 100 may be configured to determine the operating environment and adaptively switch the master/slave operation modes of the first and second earbuds 110, 120. The audio device 100 may intelligently assign master identity to the earbud with a stronger communication strength to avoid poor communication under an open field environment. If the existing master earbud is on a weaker signal strength, the audio device 100 may initiate a seamless handover process for the other earbud to take over the master identity.

Figure 3:
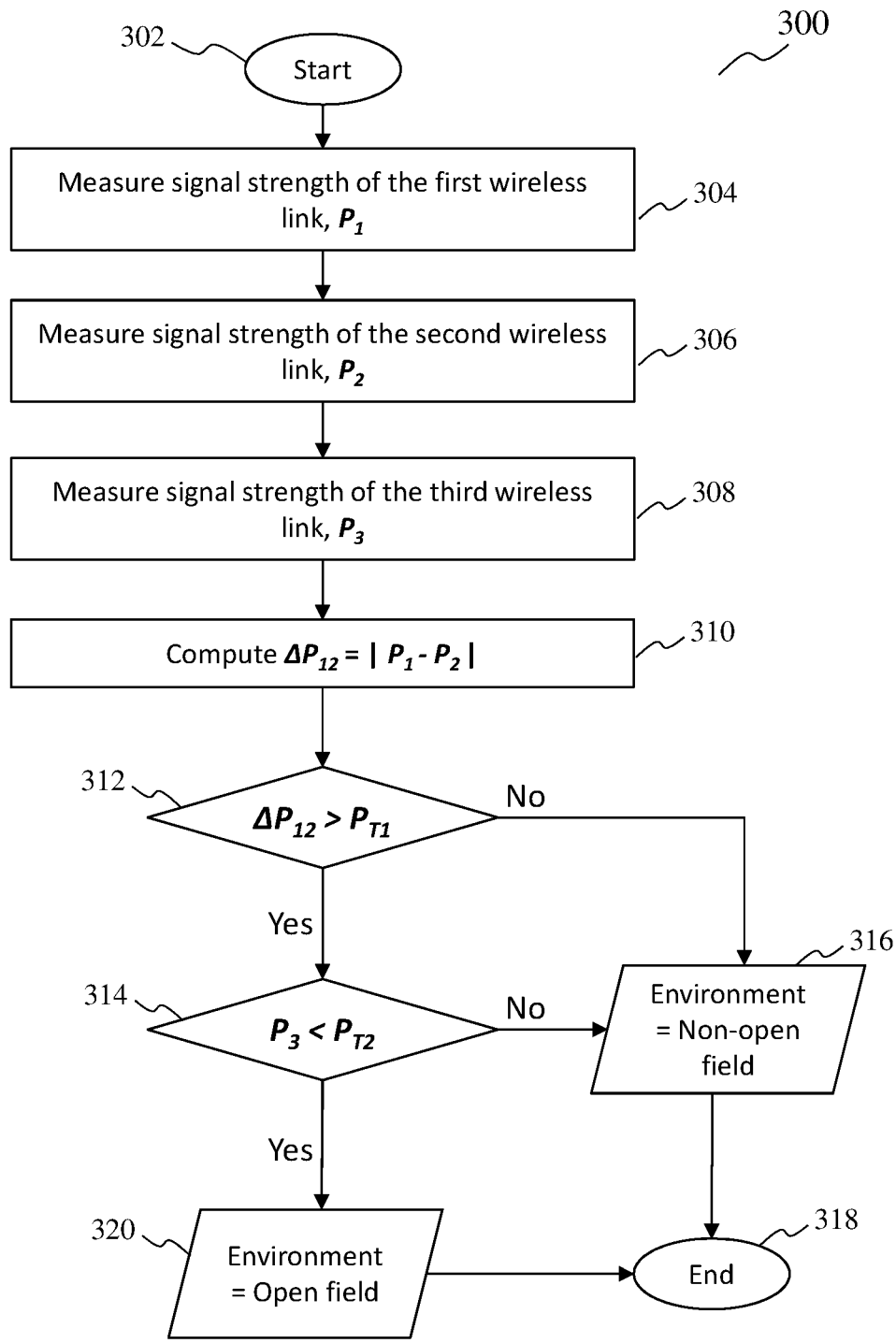
FIG. 3 shows a flowchart of a method of determining the operating environment of the audio device, according to various embodiments.

FIG. 3 shows a flowchart 300 of a method of determining the operating environment of the audio device 100, the RSSI of the second earbud 120. In 308, the audio according to various embodiments. The audio device 100 may be configured to perform the method. The process of determining the operating environment may begin at 302. In 304, the audio device 100 may measure the signal strength of the first wireless link 112, denoted as $P_1$. The signal strength of the first wireless link 112 may be measured based on the Received Signal Strength Indicator (RSSI) of the first earbud 110. In 306, the audio device 100 may measure the signal strength of the second wireless link 122, denoted as $P_2$. The signal strength of the second wireless link 122 may be measured based on device 100 may measure the signal strength of the third wireless link 132, denoted as $P_3$. In 310, the audio device 100 may compute a difference between the signal strengths of the first wireless link 112 and the second wireless link 122, the computed difference denoted as $\Delta P_{12}$. The audio device 100 may compute the difference under a moving average timing of about 10 to 20 seconds. In 312, the audio device 100 may determine whether the computed difference is larger than a first threshold denoted as $P_{T1}$. As an example, the first threshold may be in a range of 5 to 11 dB, for example, in a range of 6 to 10 dB. In an open field environment, the signal strengths of the first and second wireless links 110, 120 may differ substantially, as the diagonal communication path of the earbud that is positioned on an opposite side of the user from the audio source 102, may be blocked by the user's body, as explained above with reference to FIG. 2B. If the computed difference is larger than the first threshold, the audio device may proceed to 314, to determine whether the signal strength of the third wireless link 132 is smaller than a second threshold denoted as $P_{T2}$. As an example, the second threshold may be equal to, or less than about −85 dB. The second threshold may be lower than −85 dB, for example about −95 dB. The signal strength of the third wireless link 132 may be low in an open field environment, as the RF transmission between the first and second earbuds 110, 120 may be substantially blocked by the user's head. If the signal strength of the third wireless link is smaller than the second threshold, the audio device 100 may arrive at 320, to determine that the operating environment is an open field environment. If in 312, the audio device 100 determines that the computed difference is equal to, or smaller than the first threshold, the audio device 100 may arrive at 316, to determine that the operating environment is not an open field environment. If in 314, the audio device 100 determines that the signal strength of the third wireless link is more than, or equal to the second threshold, the audio device 100 may similarly arrive at 316, to determine that the operating environment is not an open field environment. Following the arrival at 316 or 320, the process may terminate at 318.

Figure 4:
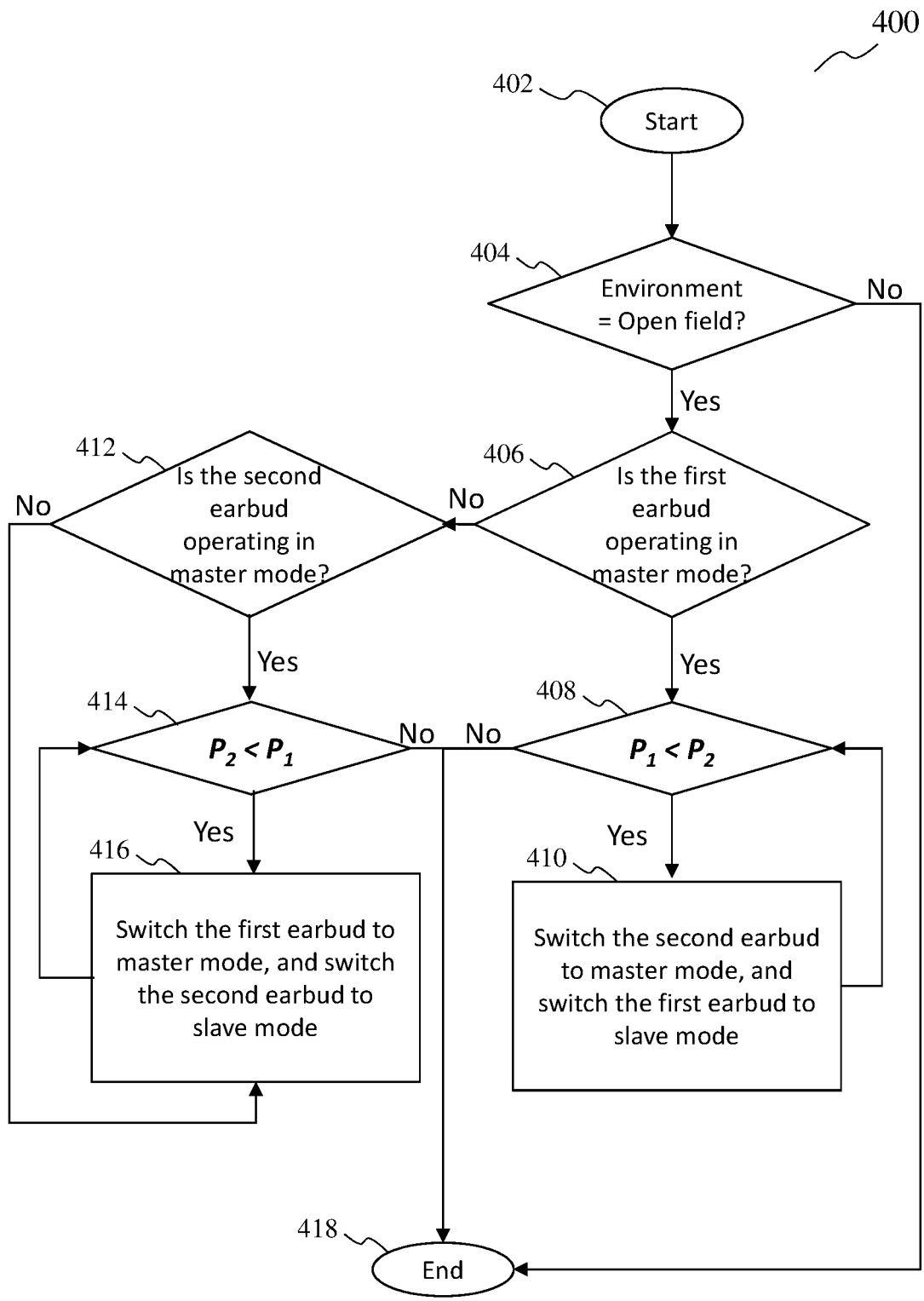
FIG. 4 shows a flowchart of a method of adaptively switching the master/slave operation modes of first and second earbuds, according to various embodiments.

FIG. 4 shows a flowchart 400 of a method of adaptively switching the master/slave operation modes of the first and second earbuds 110, 120, according to various embodiments. The audio device 100 may be configured to perform the method. The process of adaptively switching the master/slave operation modes of the earbuds may begin at 402. In 404, the audio device 100 may determine whether the operating environment is an open field environment, according to the method described with respect to FIG. 3. If the audio device 100 determines that the operating environment is an open field environment, the audio device 100 may proceed to 406, to determine whether the first earbud 110 is operating in the master mode; otherwise, the audio device 100 may proceed to 418 to terminate the adaptive switching process. If the first earbud 110 is the master earbud, the audio device 100 may proceed to 408, to determine whether the signal strength of the first wireless link 112 is smaller than the signal strength of the second wireless link 122. If the signal strength of the first wireless link 112 is smaller than the second wireless link 122, the audio device 100 may proceed to 410, to switch the second earbud 120 to master mode and to switch the first earbud 110 to slave mode; otherwise, the audio device 100 terminate the process of adaptive switching at 418.

If in 406, the audio device 100 determines that the first earbud 110 is not operating in the master mode, the audio device 100 may proceed to 412, to determine whether the second earbud 120 is operating in the master mode. If the second earbud 120 is operating in the master mode, the audio device may proceed to 414, to determine whether the signal strength of the second wireless link 122 is small than the signal strength of the first wireless link 112. If the second wireless link 122 is lower in signal strength than the first wireless link 112, the audio device 100 may proceed to 416, to switch the first earbud 110 to master mode, and to switch the second earbud 120 to slave mode; otherwise, the audio device 100 may proceed to 418 to terminate the adaptive switching process.

If in 412, the audio device 100 determines that the second earbud 120 is also not operating in the master mode, i.e. none of the earbuds are assigned to be a master earbud, the audio device 100 may proceed to 416, to assign the first earbud 110 to be the master earbud and may assign the second earbud 120 to be the slave earbud, and then proceed to 414 to check the relative signal strengths of the first and second wireless links 112, 122.

According to various embodiments, the audio device 100 may continue to operate in snooping mode (as described with respect to FIG. 1A), following 410 or 416. Alternatively, the audio device 100 may operate in relay mode (as described with respect to FIG. 1B), following 410 or 416.

Using the methods described above with respect to FIGS. 3 and 4, the audio device 100 may overcome the problem of low signal strength in an open field environment and may preserve continuity of the audio playback of the audio information transmitted by the audio source 102. As a result, the audio playback quality may be higher, with less popping and cracking noise.

According to various embodiments, the audio device 100 may be configured to prevent data loss in the audio information due to weak signal strength in an open field environment, by adjusting a buffer size of the audio device 100. The method of adjusting the buffer size based on the operating environment will be described with respect to FIGS. 5 to 7.

Figure 5:
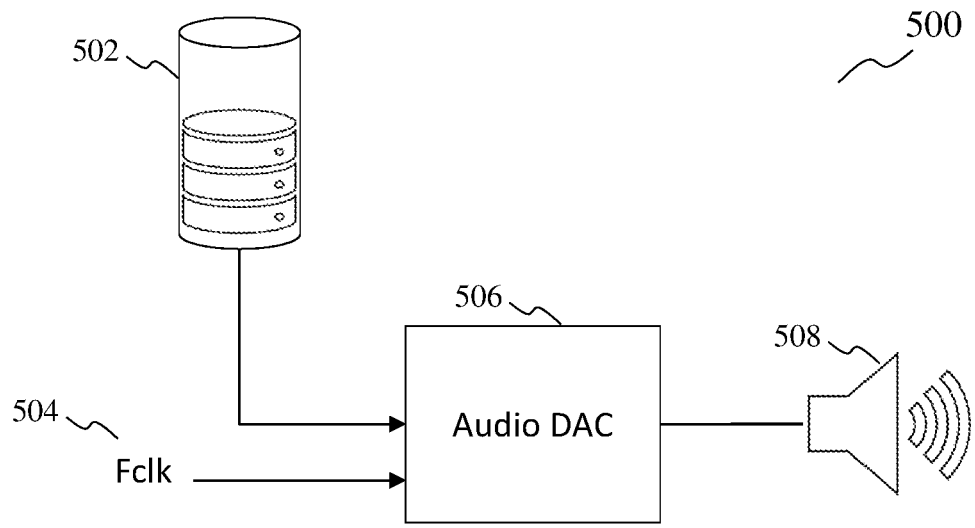
FIG. 5 shows a simplified block diagram of a transducer of an audio device according to various embodiments.

FIG. 5 shows a simplified block diagram of a transducer 500 of an audio device 100 according to various embodiments. Each of the first and second earbuds 110, 120 may include a respective transducer 500. The transducer 500 may include an audio buffer 502, a playback clock 504, an audio digital-to-analog converter (DAC) 506, and a speaker 508. The audio buffer 502 may store data packets from the audio information received from the audio source 102. The audio device 100 may control the amount of data packets stored in the audio buffer 502. The audio DAC 506 may convert data packets received from the audio buffer 502, into an analog waveform, based on a clock signal received from the playback clock 504. The speaker 508 may convert the analog waveform into sound waves.

In an open field environment, there is a likelihood of momentary signal loss due to fading which may last from a few hundreds of milliseconds to a couple of seconds. In order to mitigate such momentary loss, the audio device 100 may increase the size of the audio buffer 502 when it is operating in an open field environment. Upon determining that the operating environment is an open field environment, the audio device 100 may slow down the clock signal from the playback clock 504 to build up the audio buffer 502, for example, to double the buffer size, before reverting back to the normal clock speed. For example, the audio device 100 may slow down the playback clock 504 by 5000 parts per million (PPM) or 0.5%, against the incoming audio information from the audio source 102, to allow an increase in buffer size without affecting the output audio quality. In the event of data pack loss in the audio information, the audio device 100 may also build up a doubled or larger buffer size before playback. Increasing the audio buffer size may cause a latency in the playback of the audio. In the event that the user is watching an audio-visual (AV) media such as a video stream or a video game, on the audio source 102, slowing down the playback clock may cause the audio playback to be out of sync with the visual aspect of the AV media. To prevent such a scenario, the audio device 100 may also adjust the buffer size based on the type of media that the audio source 102 is playing.

Figure 6:
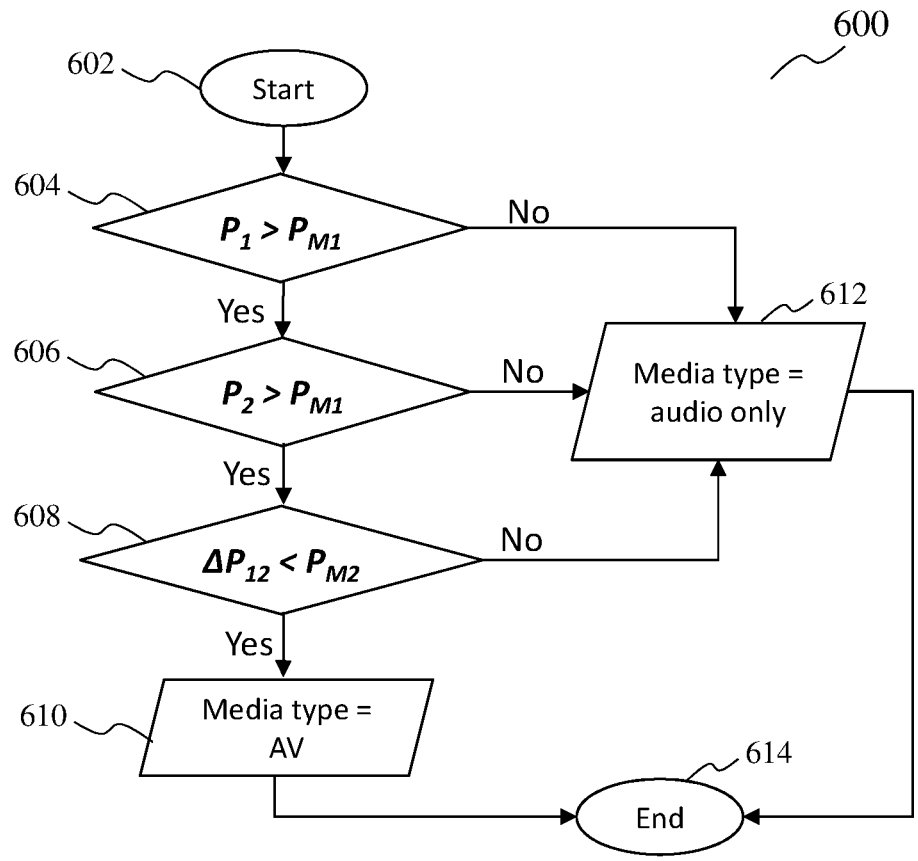
FIG. 6 shows a flowchart of a method of determining the type of media that the audio source is playing, according to various embodiments

FIG. 6 shows a flowchart 600 of a method of determining the type of media that the audio source 102 is playing, according to various embodiments. The audio device 100 may be configured to perform the method. The process of determining the type of media being played may begin at 602. In 604, the audio device 100 may determine whether the signal strength of the first wireless link 112 is larger than a first media threshold, denoted as $P_{M1}$. The signal strength of the first wireless link 112 may be obtained in 304 shown in FIG. 3. If the signal strength of the first wireless link 112 is larger than the first media threshold, the audio device 100 may proceed to 606, to determine whether the signal strength of the second wireless link 122 is also larger than the first media threshold; otherwise, the audio device 100 may arrive at 612, the determination that the media type is audio-only. The signal strength of the second wireless link 122 may be obtained in 306 shown in FIG. 3. Both the first and second wireless links 112, 122 being strong in signal strength may indicate that both the first and second earbuds 110, 120 are positioned near to the audio source 102. If the signal strength of the second wireless link 122 is larger than the first media threshold, the audio device 100 may proceed to 608, to determine whether the computed difference in signal strengths between the first and second wireless links is larger than a second media threshold, denoted as $P_{M2}$; otherwise, the audio device 100 may arrive at 612, the determination that the media type is audio-only. The computed difference in signal strengths between the first and second wireless links may be obtained in 310 shown in FIG. 3. If the computed difference in signal strengths between the first and second wireless links is smaller than the second media threshold, the audio device 100 may arrive at 610, the determination that the media type is audio-visual; otherwise, the audio device 100 may arrive at 612, the determination that the media type is audio-only. Following the determination 610 or 612, the process of determining the type of media being played may terminate at 614. When a user is playing an AV media on the audio source 102, the user is likely to position the audio source 102 within his visual range, for example, about 30 cm to 1 m away from his eyes. Consequently, the audio source 102 is in close proximity to the earbuds that are worn on the user's ears. The first media threshold may be for example, about −70 dB. When the user is watching an AV media on the audio source 102, the user is likely to position the audio source 102 in front of his face with direct line-of-sight. As such, the audio source 102 is likely to be approximately equidistant from either earbud, such that the signal strengths of the first and second wireless links 112, 122 may be at least substantially similar in magnitude. The second media threshold may be, for example, about −85 dB or lower.

Figure 7:
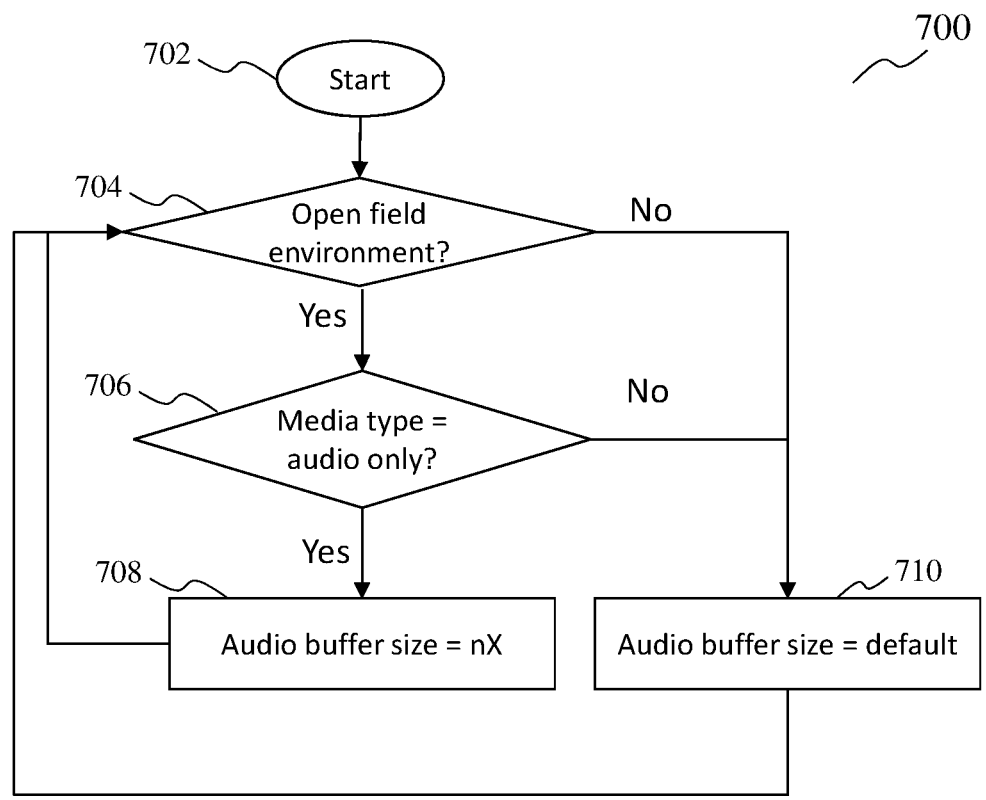
FIG. 7 shows a flowchart of a method of adjusting the audio buffer size based on the type of media that the audio source is playing, according to various embodiments.

FIG. 7 shows a flowchart 700 of a method of adjusting the audio buffer size based on the type of media that the audio source 102 is playing, according to various embodiments. The audio device 100 may be configured to perform the method. The process of adjusting the audio buffer size may begin at 702. In 604, the audio device 100 may determine whether the operating environment is an open field environment, according to the method described with respect to FIG. 3. If the operating environment is an open field environment, the audio device 100 may proceed to 706, to determine whether the media is an audio-only media, according to the method described with respect to FIG. 6. If the audio device 100 determines that the media is an audio-only media, the audio device 100 may increase the audio buffer size to nX, a multiple of the default buffer size, in 708. When the audio device 100 detects that the operating environment is no longer an open field environment, or if the media type is no longer audio-only, the audio device 100 may adjust the audio buffer size to the default size, in 710. Alternatively, the audio device 100 may skip a first portion of the increased audio buffer to resume the normal buffer playback.

According to various embodiments, the audio device 100 may perform the methods shown in FIGS. 3, 4, 6 and 7, using a set of circuits in the first earbud 110 or the second earbud 120. Each of the first earbud 110 and the second earbud 120 may include a respective set of the circuits, although only one set of circuit may be required to perform the methods. The methods may be performed using the set of circuits in the earbud that is operating in the master mode. Each of the first and second earbuds 110, 120 may include a respective processor that implements the respective set of circuits. The set of circuits may include a measurement circuit that performs 304, 306 and 308. The set of circuits may further include a computation circuit that performs 310. The set of circuits may further include a determination circuit that performs 312, 314, 316, and 320. The determination circuit may also perform 404, 406, 412, 408, and 414. The determination circuit may also perform 604, 606, 608, 610, 612, 704 and 706. The set of circuits may further include a controller circuit that performs 410 and/or 416. The set of circuits may further include a buffer controller that performs 708 and 710.

According to various embodiments, the audio device 100 may be configured to detect a use state of the earbuds, including whether the earbuds are being worn by the user, and may be configured to control an operation mode of the earbuds accordingly. The audio device 100 may not require a proximity sensor to detect the use state of the earbuds, and thereby save on space within the earbud and also reduce the power consumption of the earbuds.

Figure 8:
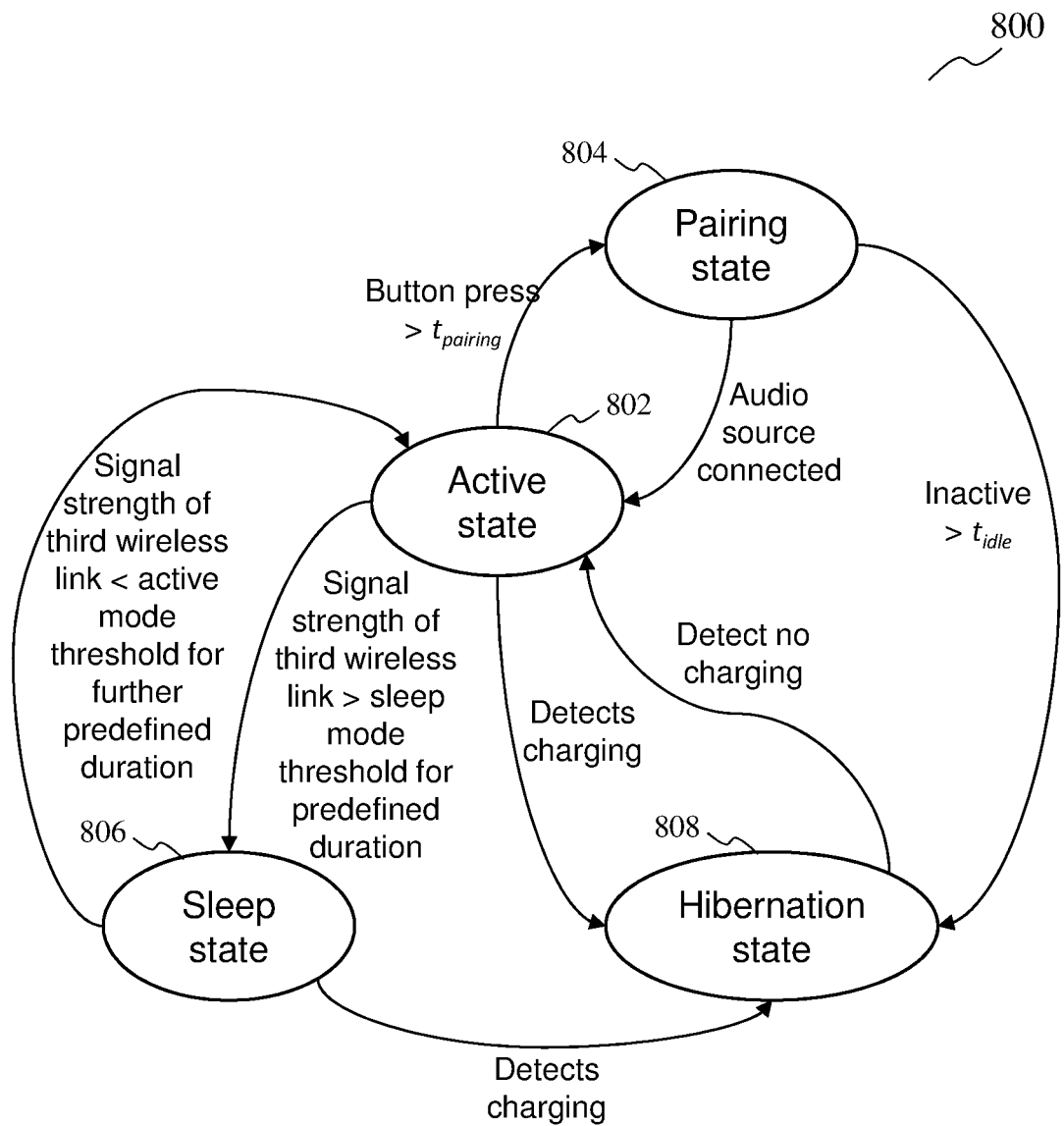
FIG. 8 shows a state diagram of an audio device according to various embodiments.

FIG. 8 shows a state diagram 800 of the audio device 100, according to various embodiments. The audio device 100 may be in an active state 802, when the first and second earbuds 110, 120 are positioned in the user's ears and playing audio. In the active state 802, both the first and second wireless links 112, 122 are established, i.e. connected with the audio source 102. When the audio device 100 detects that the signal strength of the third wireless link 132 exceeds a sleep mode threshold continuously during a predefined duration, the audio device 100 may enter a sleep state 806. The audio device 100 may include a comparison circuit in at least one of the first and second earbuds 110, 120. The comparison circuit may be configured to compare the signal strength of the third wireless link 132 against the sleep mode threshold. Alternatively, the comparison may be performed by the determination circuit. When the first and second earbuds 110, 120 are removed from the user's ears, the signal strength of the third wireless link 132 may increase substantially, as the user's head is no longer blocking the communication path between the earbuds. The sleep mode threshold may be for example, −50 dB. The predefined duration may be, for example, 20 to 30 seconds. In the sleep state 806, the audio device 100 may disconnect the first and second wireless links 112, 122, i.e. to cease communication with the audio source 102. The third wireless link 132 may, however, be maintained. The earbuds may consume very low power in the sleep state 806. In the sleep state 806, the earbuds may cease operation except to check for events at regular time intervals. The events may include checking the signal strength of the third wireless link 132, as measured by a measurement circuit of one of the first and second earbuds 110, 120. In the sleep state 806, the audio device 100 may check the signal strength of the third wireless link 132 at a regular interval of, for example, 100 to 200 milliseconds. If the signal strength of the third wireless link 132 decreases to less than an active mode threshold, for a further predefined duration, the audio device 100 may revert to the active state 802. The active mode threshold may be 10 dB lower than the sleep mode threshold, for example, −60 dB. The further predefined duration may be, for example, 1 to 2 seconds. If in the sleep state 806, the audio device 100 detects that the earbuds are being charged, the audio device 100 may enter a hibernation state 808. In the hibernation state 808, the earbuds shut off their internal processor or circuits. In the hibernation state 808, the earbuds may cease operation and may rely on an external input signal to resume operation. The audio device 100 may also enter the hibernation state 808 from the active state 802, when it detects that the earbuds are being charged. The audio device 100 may exit the hibernation state 808 and return to the active state 802, upon detecting that the earbuds are no longer being charged.

From the active state 802, the audio device 100 may enter a pairing state 804, when a user presses a connection button for at least a pairing duration, denoted as $t_{pairing}$. In the pairing state 804, the first and second earbuds 110, 120 may initiate connection with the audio source 102, in other words, establish the first and second wireless links 112, 122, respectively. Upon connecting to the audio source 102, the audio device 100 may return to the active state 802. In the pairing state 804, if the connection with the audio source 102 cannot be established within an idle time threshold, denoted as $t_{idle}$, the audio device 100 may enter the hibernation state 808. The inability to connect to the audio source 102 within the idle time threshold may indicate that the audio source 102 may be unavailable or out of communication range, and as such, entering hibernation state 808 may conserve power for the audio device 100.

Figure 9:
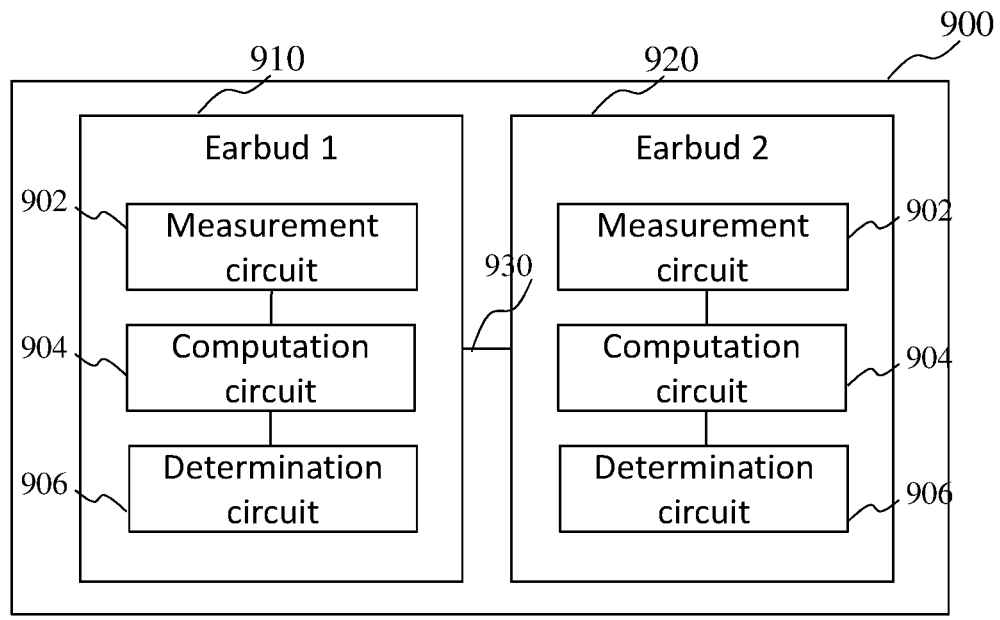
FIG. 9 shows a block diagram of an audio device according to various embodiments.

FIG. 9 shows a block diagram of an audio device 900 according to various embodiments. The audio device 900 may include a first earbud 910 and a second earbud 920. The first earbud 910 may be configured to establish a first wireless link with an audio source, and receive, from the audio source, audio information over the first wireless link. The second earbud 920 may be configured to establish a second wireless link with the audio source, and receive, from the audio source, audio information over the second wireless link. The first earbud 910 and the second earbud 920 may be further configured to communicate with one another over a third wireless link. At least one of the first earbud 910 and the second earbud 920 may include a measurement circuit 902, a computation circuit 904, and a determination circuit 906. The measurement circuit 902 may be configured to measure respective signal strengths of the first, second and third wireless links. The computation circuit 904 may be configured to compute a difference in signal strengths of the first and second wireless links. The determination circuit 906 may be configured to determine an operating environment of the audio device 900 based on the computed difference and further based on the signal strength of the third wireless link. The first earbud 910, the second earbud 920, the measurement circuit 902, the computation circuit 904, and the determination circuit 906 may be coupled with each other, like indicated by lines 930, for example electrically coupled, for example using a line or a cable, and/or communicatively coupled. The audio device 900 may include, or may be part of, the audio device 100. The first and second earbuds 910, 920 may include, or may be part of, the first and second earbuds 110, 120.

Figure 10:
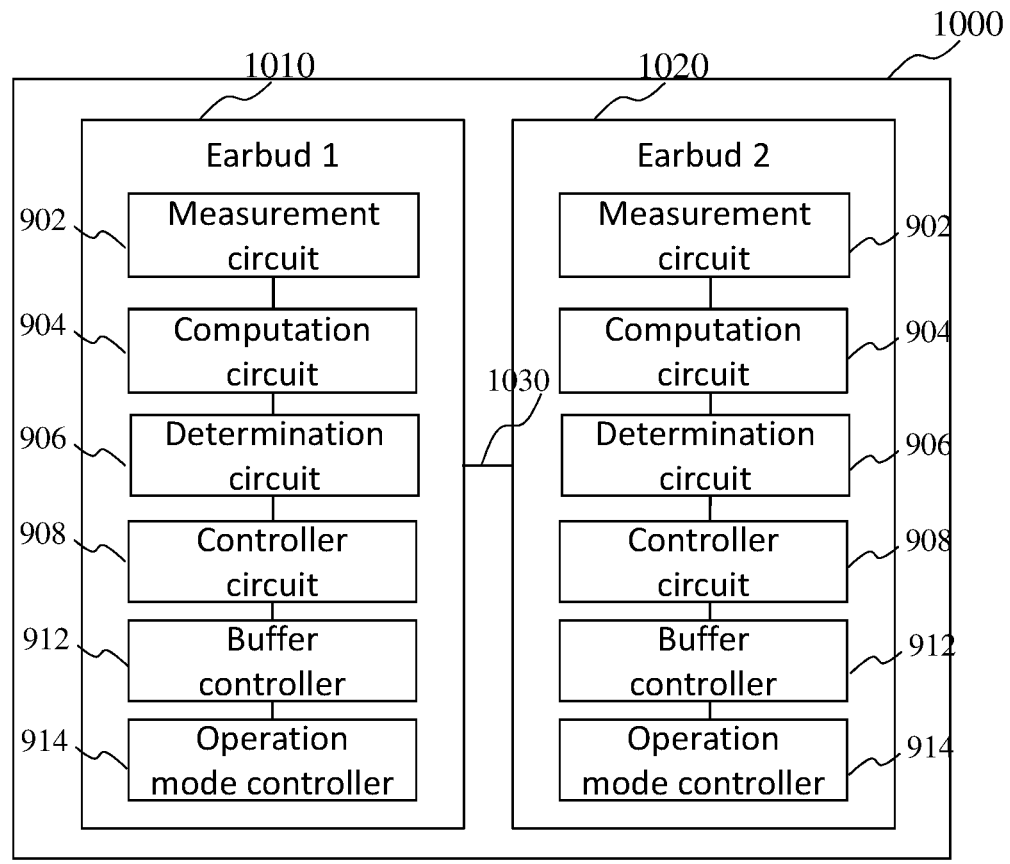
FIG. 10 shows a block diagram of an audio device according to various embodiments.

FIG. 10 shows a block diagram of an audio device 1000 according to various embodiments. The audio device 1000 may include a first earbud 1010 and a second earbud 1020. Compared to the first earbud 910, the first earbud 1010 may further include a controller circuit 908, a buffer controller 912 and an operation mode controller 914. Similarly, compared to the second earbud 920, the second earbud 1020 may further include another controller circuit 908, another buffer controller 912 and another operation mode controller 914. The controller circuit 908 may be configured to control the first earbud 1010 to operate in a slave mode and to control the second earbud 1020 to operate in a master mode, based on the determination circuit 906 determining that the signal strength of the first wireless link is lower than the signal strength of the second wireless link and further based on the determined operating environment. The buffer controller 912 may be configured to increase a buffer size of the audio device 1000 based on the determined operating environment and further based on determining that the audio source is playing an audio-only media. The operation mode controller 914 may be configured to switch the audio device 1000 to operate in a sleep mode, based on the determination circuit 906 determining that the signal strength of the third wireless link is larger than a sleep mode threshold continuously during a predefined duration. In the sleep mode, the first and second wireless links may be disconnected. The first earbud 1010, the second earbud 1020, the measurement circuit 902, the computation circuit 904, the determination circuit 906, the controller circuit 908, the buffer controller 912 and the operation mode controller 914 may be coupled with each other, like indicated by lines 1030, for example electrically coupled, for example using a line or a cable, and/or communicatively coupled. The audio device 1000 may include, or may be part of, the audio device 100. The first and second earbuds 1010, 1020 may include, or may be part of, the first and second earbuds 110, 120.

Figure 11:
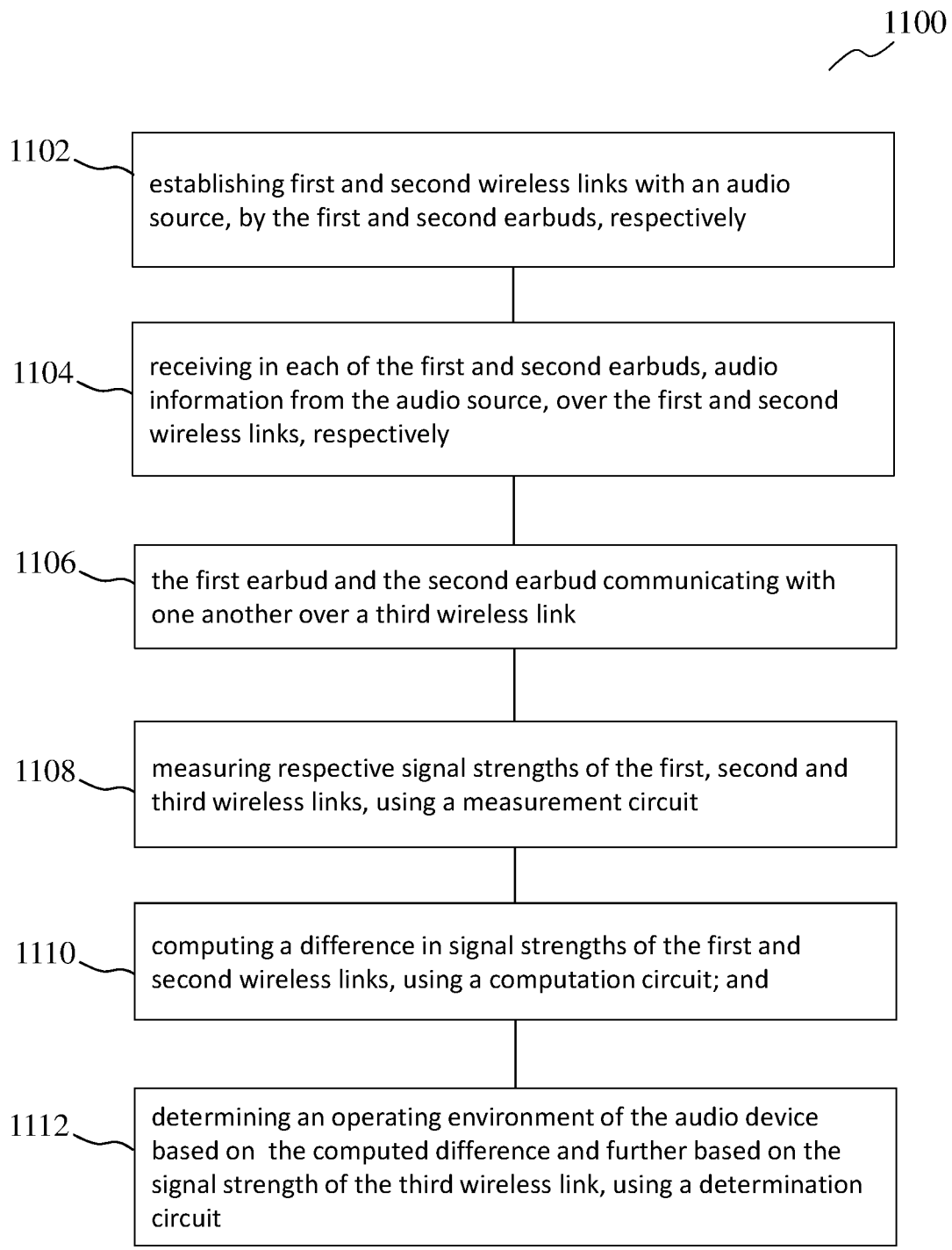
FIG. 11 shows a flow diagram of a method of operating an audio device according to various embodiments.

FIG. 11 shows a flow diagram 1100 of a method of operating an audio device according to various embodiments. The method may include establishing first and second wireless links with an audio source, by first and second earbuds of the audio device, respectively, in 1102. The method may further include receiving in each of the first and second earbuds, audio information from the audio source, over the first and second wireless links, respectively, in 1104. The method may further include the first earbud and the second earbud communicating with one another over a third wireless link, in 1106. The method may further include measuring respective signal strengths of the first, second and third wireless links, using a measurement circuit, in 1108. The method may further include computing a difference in signal strengths of the first and second wireless links, using a computation circuit, in 1110. The method may further include determining an operating environment of the audio device based on the computed difference and further based on the signal strength of the third wireless link, using a determination circuit, in 1112.

Figure 12:
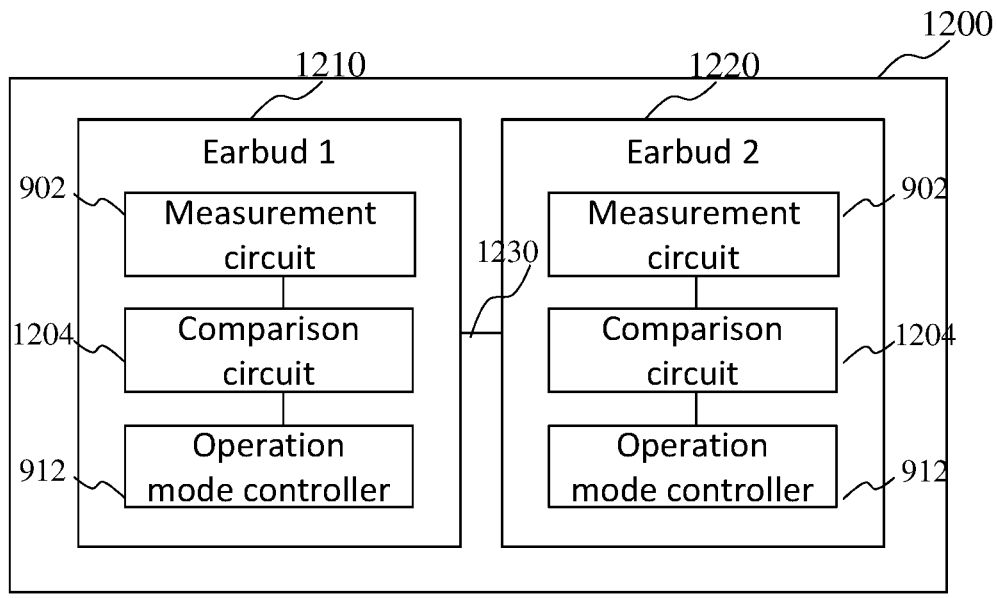
FIG. 12 shows a block diagram of an audio device according to various embodiments.

FIG. 12 shows a block diagram of an audio device 1200 according to various embodiments. The audio device 1200 may include a first earbud 1210 and a second earbud 1220. The first earbud 1210 may be configured to establish a first wireless link with an audio source, and receive, from the audio source, audio information over the first wireless link. The second earbud 1220 may be configured to establish a second wireless link with the audio source, and receive, from the audio source, audio information over the second wireless link. The first earbud 1210 and the second earbud 1220 may be further configured to communicate with one another over a third wireless link. At least one of the first earbud 1210 and the second earbud 1220 may include a measurement circuit 1202, a comparison circuit 1204, and an operation mode controller 1206. The measurement circuit 1202 may be configured to measure signal strength of the third wireless link. The comparison circuit 1204 may be configured to compare the measured signal strength of the third wireless link against a predefined threshold during a predefined duration. The operation mode controller 1206 may be configured to switch the audio device 1200 to operate in a sleep mode, based on the comparison indicating that the measured signal strength of the third wireless link is larger than the predefined threshold continuously during the predefined duration. The first and second wireless links may be disconnected in the sleep mode. The first earbud 1210, the second earbud 1220, the measurement circuit 1202, the comparison circuit 1204, and the operation mode controller 1206 may be coupled with each other, like indicated by lines 1230, for example electrically coupled, for example using a line or a cable, and/or communicatively coupled. The audio device 1200 may include, or may be part of, the audio device 100. The first and second earbuds 1210, 1220 may include, or may be part of, the first and second earbuds 1210, 1220.

Figure 13:
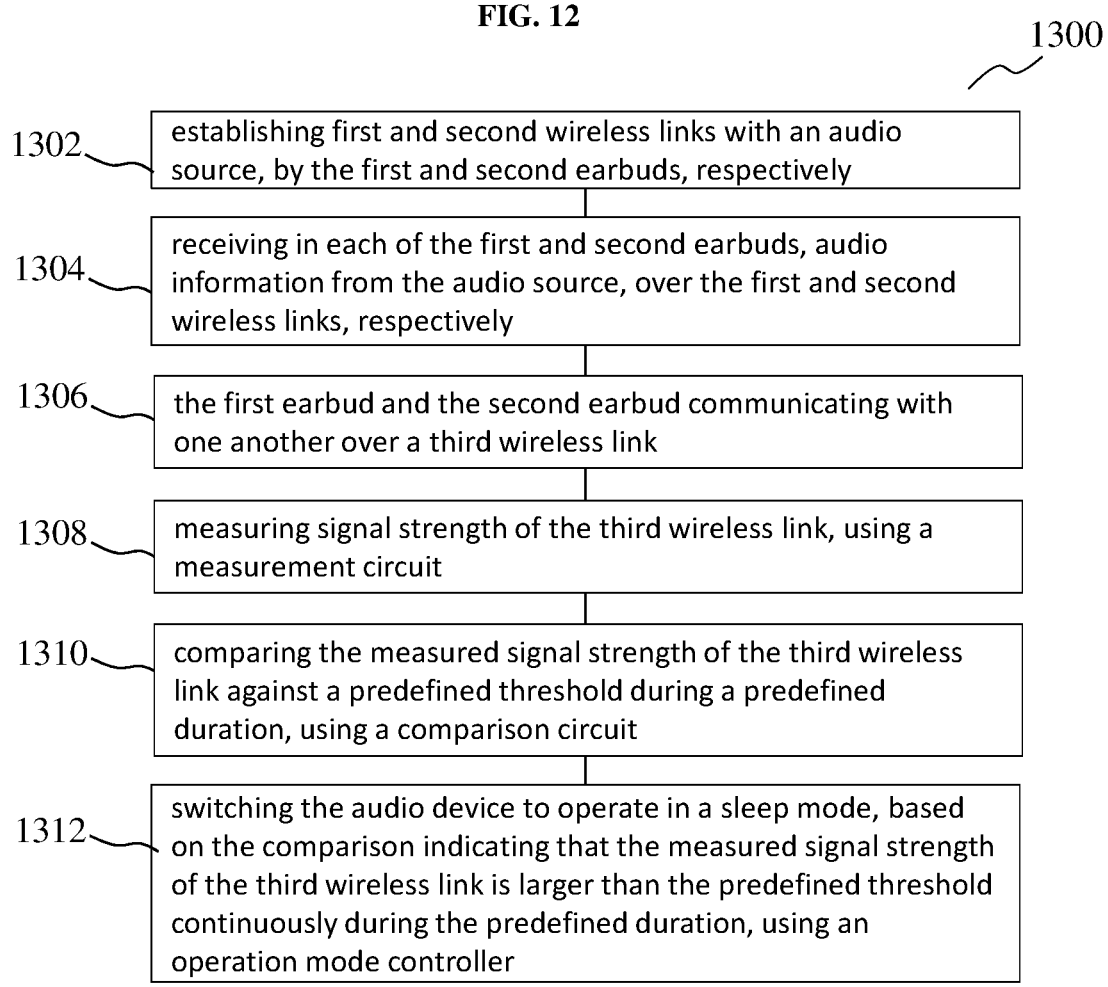
FIG. 13 shows a flow diagram of a method of operating an audio device according to various embodiments.

FIG. 13 shows a flow diagram 1300 of a method of operating an audio device according to various embodiments. The method may include establishing first and second wireless links with an audio source, by first and second earbuds of the audio device, respectively, in 1302. The method may further include receiving in each of the first and second earbuds, audio information from the audio source, over the first and second wireless links, respectively, in 1304. The method may further include the first earbud and the second earbud communicating with one another over a third wireless link, in 1306. The method may further include measuring signal strength of the third wireless link, using a measurement circuit, in 1308. The method may further include comparing the measured signal strength of the third wireless link against a predefined threshold during a predefined duration, using a comparison circuit, in 1310. The method may further include switching the audio device to operate in a sleep mode, based on the comparison indicating that the measured signal strength of the third wireless link is larger than the predefined threshold continuously during the predefined duration, using an operation mode controller, in 1312. The first and second wireless links may be disconnected in the sleep mode.

The following examples pertain to further embodiments.

Example 1 is an audio device including: a first earbud and a second earbud. The first earbud is configured to: establish a first wireless link with an audio source; and receive, from the audio source, audio information over the first wireless link. The second earbud is configured to: establish a second wireless link with the audio source; and receive, from the audio source, audio information over the second wireless link. The first earbud and the second earbud are further configured to communicate with one another over a third wireless link. At least one of the first earbud and the second earbud includes: a measurement circuit configured to measure respective signal strengths of the first, second and third wireless links; a computation circuit configured to compute a difference in signal strengths of the first and second wireless links; and a determination circuit configured to determine an operating environment of the audio device based on the computed difference and further based on the signal strength of the third wireless link.

In example 2, the subject-matter of example 1 can optionally include that the determination circuit is further configured to determine that the operating environment is an open field, based on determining that the computed difference exceeds a first threshold and further based on determining that the signal strength of the third wireless link is less than a second threshold.

In example 3, the subject-matter of example 2 can optionally include that the first threshold is in a range of 6 dB to 10 dB.

In example 4, the subject-matter of any one of examples 2 to 3 can optionally include that the second threshold is equal to, or lower than −85 dB.

In example 5, the subject-matter of any one of examples 1 to 4 can optionally include that both the first earbud and the second earbuds includes: a respective measurement circuit; a respective computation circuit; and a respective determination circuit.

In example 6, the subject-matter of any one of examples 1 to 5 can optionally include that at least one of the first earbud and the second earbud includes: a controller circuit configured to control the first earbud to operate in a slave mode and to control the second earbud to operate in a master mode, based on the determination circuit determining that the signal strength of the first wireless link is lower than the signal strength of the second wireless link and further based on the determined operating environment.

In example 7, the subject-matter of example 6 can optionally include that the first earbud, when operating in the slave mode, is configured to transmit link information about the first wireless link to the second earbud operating in the master mode over the third wireless link, and wherein the second earbud, when operating in the master mode, is configured to receive the link information about the first wireless link from the first earbud operating in the slave mode and is further configured to transmit status information that includes the received link information, to the audio source over the second wireless link.

In example 8, the subject-matter of any one of examples 6 to 7 can optionally include that the first earbud, when operating in the slave mode, is configured to stop receiving audio information over the first wireless link, and wherein the second earbud, when operating in the master mode, is configured to relay the audio information received from the audio source, to the first earbud over the third wireless link.

In example 9, the subject-matter of any one of examples 1 to 8 can optionally include that the determination circuit is further configured to determine that the audio source is playing an audio-visual media, based on determining that the signal strengths of each the first and second wireless links exceed a first media threshold and further based on determining that the computed difference is less than a second media threshold.

In example 10, the subject-matter of example 9 can optionally include that the first media threshold is −70 dB.

In example 11, the subject-matter of any one of examples 9 to 10 can optionally include that the second media threshold is −85 dB.

In example 12, the subject-matter of any one of examples 1 to 11 can optionally include the determination circuit is further configured to determine that the audio source is playing an audio-only media, based on determining that the signal strengths of each of the first and second wireless links are equal to, or below a first media threshold.

In example 13, the subject-matter of example 12 can optionally include that at least one of the first and second earbuds includes: a buffer controller configured to increase a buffer size of the audio device based on the determined operating environment and further based on determining that the audio source is playing an audio-only media.

In example 14, the subject-matter of any one of examples 1 to 13 can optionally include that at least one of the first and second earbuds includes: an operation mode controller configured to switch the audio device to operate in a sleep mode, based on the determination circuit determining that the signal strength of the third wireless link is larger than a sleep mode threshold continuously during a predefined duration, wherein in the sleep mode, the first and second wireless links are disconnected.

In example 15, the subject-matter of example 14 can optionally include that the measurement circuit is configured to measure the signal strength of the third wireless link in the sleep mode, wherein the operation mode controller is further configured to switch the audio device to operate in an active mode, based on the determination circuit determining that the signal strength of the third wireless link in the sleep mode is lower than an active mode threshold, and wherein in the active mode, the first and second wireless links are established with the audio source.

Example 16 is an audio device including: a first earbud and a second earbud. The first earbud is configured to: establish a first wireless link with an audio source; and receive, from the audio source, audio information over the first wireless link. The second earbud is configured to: establish a second wireless link with the audio source; and receive, from the audio source, audio information over the second wireless link. The first earbud and the second earbud are further configured to communicate with one another over a third wireless link. At least one of the first earbud and the second earbud includes: a measurement circuit configured to measure signal strength of the third wireless link; a comparison circuit configured to compare the measured signal strength of the third wireless link against a predefined threshold during a predefined duration; and an operation mode controller configured to switch the audio device to operate in a sleep mode, based on the comparison indicating that the measured signal strength of the third wireless link is larger than the predefined threshold continuously during the predefined duration, wherein in the sleep mode, the first and second wireless links are disconnected.

In example 17, the subject-matter of example 16 can optionally include that both the first earbud and the second earbud includes: a respective measurement circuit; a respective comparison circuit; and a respective operation mode controller.

In example 18, the subject-matter of any one of examples 16 to 17 can optionally include that the measurement circuit is configured to measure the signal strength of the third wireless link in the sleep mode, wherein the comparison circuit is further configured to compare the measured signal strength of the third wireless link in the sleep mode against a further predefined threshold, and wherein the operation mode controller is further configured to switch the audio device to operate in an active mode, based on the comparison indicating that the measured signal strength of the third wireless link in the sleep mode is lower than the further predefined threshold, wherein in the active mode, the first and second wireless links are established with the audio source.

In example 19, the subject-matter of example 18 can optionally include that the further predefined threshold is 10 dB lower than the predefined threshold.

Example 20 is a method of operating an audio device including a first earbud and a second earbud. The method includes: establishing first and second wireless links with an audio source, by the first and second earbuds, respectively; receiving in each of the first and second earbuds, audio information from the audio source, over the first and second wireless links, respectively; the first earbud and the second earbud communicating with one another over a third wireless link; measuring respective signal strength of the third wireless link, using a measurement circuit; comparing the measured signal strength of the third wireless link against a predefined threshold during a predefined duration, using a comparison circuit; and switching the audio device to operate in a sleep mode, based on the comparison indicating that the measured signal strength of the third wireless link is larger than the predefined threshold continuously during the predefined duration, using an operation mode controller, wherein in the sleep mode, the first and second wireless links are disconnected.

In example 21, the subject-matter of example 20 can optionally include: measuring the signal strength of the third wireless link in the sleep mode, using the measurement circuit; comparing the measured signal strength of the third wireless link in the sleep mode against a further predefined threshold, using the comparison circuit; and switching the audio device to operate in an active mode, based on the comparison indicating that the measured signal strength of the third wireless link in the sleep mode is lower than the further predefined threshold, using the operation mode controller, wherein in the active mode, the first and second wireless links are established with the audio source.

In example 22, the subject-matter of example 21 can optionally include that the further predefined threshold is 10 dB lower than the predefined threshold.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An audio device comprising:
a first earbud configured to:
establish a first wireless link with an audio source; and
receive, from the audio source, audio information over the first wireless link;
a second earbud configured to:
establish a second wireless link with the audio source; and
receive, from the audio source, audio information over the second wireless link,
wherein the first earbud and the second earbud are further configured to communicate with one another over a third wireless link;
wherein at least one of the first earbud and the second earbud comprises:
a measurement circuit configured to measure respective signal strengths of the first, second and third wireless links;
a computation circuit configured to compute a difference in signal strengths of the first and second wireless links; and
a determination circuit configured to determine if an operating environment of the audio device is an open field environment which is void of any reflectors for Radio Frequency signals based on the computed difference and further based on the signal strength of the third wireless link.

2. The audio device of claim 1, wherein the determination circuit is further configured to:
determine that the operating environment is the open field environment, based on determining that the computed difference exceeds a first threshold and further based on determining that the signal strength of the third wireless link is less than a second threshold;
determine that the operating environment is an indoor environment which comprises at least one reflector for Radio Frequency signals based on determining that the computed difference does not exceed the first threshold or determining that the computed difference exceeds the first threshold and the signal strength of the third wireless link is not less than the second threshold.

3. The audio device of claim 2, wherein the first threshold is in a range of 6 dB to 10 dB, or, the second threshold is equal to, or lower than −85 dB.

4. The audio device of claim 1, wherein both the first earbud and the second earbud comprise:
a respective measurement circuit;
a respective computation circuit; and
a respective determination circuit.

5. The audio device of claim 1, wherein at least one of the first earbud and the second earbud comprises:
a controller circuit configured to control the first earbud to operate in a slave mode and to control the second earbud to operate in a master mode, based on the determination circuit determining that the signal strength of the first wireless link is lower than the signal strength of the second wireless link and the operating environment of the audio device is the open field environment.

6. The audio device of claim 5,
wherein the first earbud, when operating in the slave mode, is configured to transmit link information about the first wireless link to the second earbud operating in the master mode over the third wireless link, and
wherein the second earbud, when operating in the master mode, is configured to receive the link information about the first wireless link from the first earbud operating in the slave mode and is further configured to transmit status information that includes the received link information, to the audio source over the second wireless link.

7. The audio device of claim 5,
wherein the first earbud, when operating in the slave mode, is configured to stop receiving audio information over the first wireless link, and
wherein the second earbud, when operating in the master mode, is configured to relay the audio information received from the audio source, to the first earbud over the third wireless link.

8. The audio device of claim 1, wherein the determination circuit is further configured to determine that the audio source is playing an audio-visual media, based on determining that the signal strengths of each the first and second wireless links exceed a first media threshold and further based on determining that the computed difference is less than a second media threshold.

9. The audio device of claim 8, wherein the first media threshold is −70 dB, or, the second media threshold is −85 dB.

10. The audio device of claim 1, wherein the determination circuit is further configured to determine that the audio source is playing an audio-only media, based on determining that the signal strengths of each of the first and second wireless links are equal to, or below a first media threshold.

11. The audio device of claim 10, wherein at least one of the first and second earbuds comprises:
a buffer controller configured to increase a buffer size of the audio device based on the determined operating environment and further based on determining that the audio source is playing an audio-only media.

12. The audio device of claim 1, wherein at least one of the first and second earbuds comprises:
an operation mode controller configured to switch the audio device to operate in a sleep mode, based on the determination circuit determining that the signal strength of the third wireless link is larger than a sleep mode threshold continuously during a predefined duration,
wherein in the sleep mode, the first and second wireless links are disconnected.

13. The audio device of claim 12,
wherein the measurement circuit is configured to measure the signal strength of the third wireless link in the sleep mode,
wherein the operation mode controller is further configured to switch the audio device to operate in an active mode, based on the determination circuit determining that the signal strength of the third wireless link in the sleep mode is lower than an active mode threshold, and
wherein in the active mode, the first and second wireless links are established with the audio source.

14. The audio device of claim 13, wherein the active mode threshold is 10 dB lower than the sleep mode thresold.

15. The audio device of claim 12, wherein the sleep mode threshold is −50 dB.

16. The audio device of claim 12, wherein the predefined duration is 20 to 30 seconds.

* * * * *